R. J. ABBOTT.
RACK FOR COOKING UTENSILS.
APPLICATION FILED NOV. 27, 1915.

1,211,269.

Patented Jan. 2, 1917.

Witnesses

Inventor
R. J. Abbott
By Victor J. Evans
Attorney

UNITED STATES PATENT OFFICE.

ROBERT J. ABBOTT, OF WASHINGTON, DISTRICT OF COLUMBIA.

RACK FOR COOKING UTENSILS.

1,211,269. Specification of Letters Patent. Patented Jan. 2, 1917.

Application filed November 27, 1915. Serial No. 63,799.

*To all whom it may concern:*

Be it known that I, ROBERT J. ABBOTT, a citizen of the United States, residing at Washington, in the District of Columbia, have invented new and useful Improvements in Racks for Cooking Utensils, of which the following is a specification.

The invention relates to a rack and more particularly to the class of adjustable and foldable supporting racks for cooking or steaming receptacles.

The primary object of the invention is the provision of a rack of this character wherein pans, trays or the like utensils can be conveniently held superposed with respect to each other within a cooking receptacle or steamer, thereby enabling eatables therein to be properly and uniformly cooked and thereafter removed in a single operation from the receptacle or steamer.

Another object of the invention is the provision of a rack of this character wherein the same can be readily and easily folded when not in use and also can be extended and adjusted to accommodate itself for different sizes of receptacles or steamers.

A further object of the invention is the provision of a rack of this character which is extremely simple in construction, thoroughly reliable and efficient in its purpose, strong, durable and inexpensive of manufacture.

Other objects will be in part obvious and in part hereinafter pointed out.

The invention accordingly consists in the features of construction, combination of elements and arrangement of parts which will be exemplified in the construction hereinafter set forth and the scope of the application of which will be indicated in the claim hereunto appended.

Figure 1:
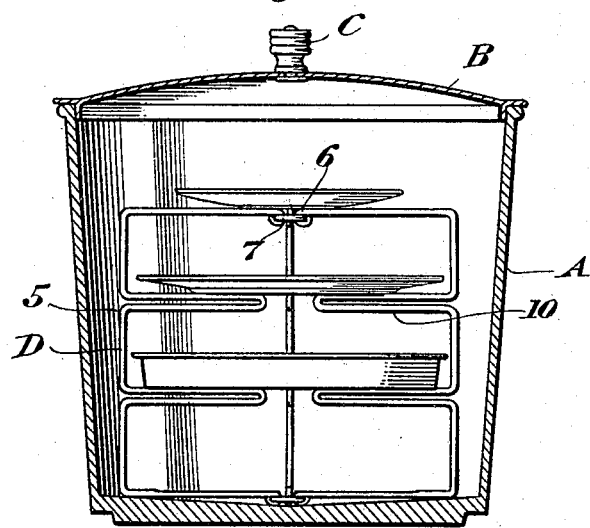
Figure 2:
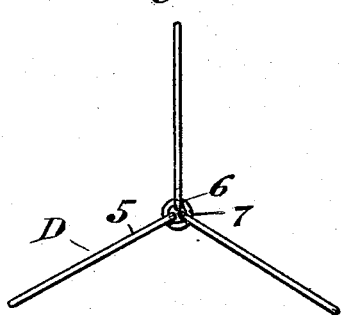
Figure 3:
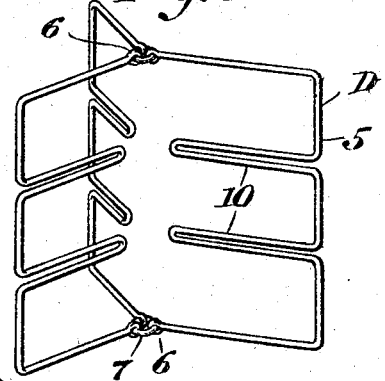
Figure 4:
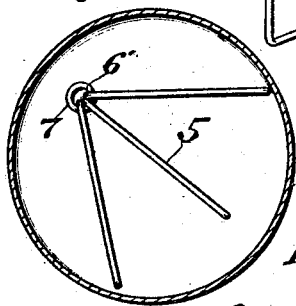

In the accompanying drawing: Figure 1 is a vertical sectional view through a receptacle or steamer showing the rack constructed in accordance with the invention extended and supporting pans and trays; Fig. 2 is a top plan view of the rack when extended; Fig. 3 is a perspective view of the rack; Fig. 4 is a horizontal transverse sectional view showing the rack in an adjusted position other than shown in Figs. 1, 2 and 3 of the drawing.

Similar reference characters indicate corresponding parts throughout the several views in the drawing.

Referring to the drawing in detail, A designates a portion of a receptacle or steamer having a removable lid B, as usual, which is provided with a central hand knob C so as to permit the convenient placing of the lid upon the receptacle A or its removal therefrom, the receptacle being of the ordinary well known construction, and is merely shown to illustrate the manner of use of the rack hereinafter fully described.

The rack comprises a series of frames D, each formed from a single wire 5 bent into substantially U-shape and having eye terminals 6 through which are loosely passed rings 7 swingingly and flexibly connecting all of the frames together. Each wire 5 is bent intermediate its limbs to form inwardly projecting superposed parallel rests 10 which extend substantially the length of the limbs of the said frame.

In the use of the rack the frames D are extended in the position shown in Figs. 1, 2 and 3 so that pans 9 and trays or plates 10 can be placed therein for supporting the eatables contained within the said pans, trays or plates for the cooking of the eatables or the contents thereof within the receptacle A as shown. When the rack is not to be used the same can be readily folded by swinging the frames 5 in substantially parallel relation to each other, thereby rendering the said rack compact so that it can be stored within the least possible space.

In Fig. 4 there is shown an adjustment of the rack differently than the adjustment shown in Figs. 1, 2 and 3 so that the said rack can be placed within a smaller receptacle or, in fact, on the proper adjustment thereof it will fit in various sized receptacles for use in supporting trays in superposed relation to each other.

From the foregoing description, taken in connection with the accompanying drawings, the construction and manner of use of the invention will be readily apparent, and a more extended explanation has, therefore, been omitted.

Having thus described my invention, I claim:

A rack of the character described comprising a pair of ring members, and U-shaped frames having eye terminals loosely embracing the pair of rings for the free swinging movement of the frame, each of said frames being bent to form rests, the rests of the respective frames being arranged in superposed relation to each other.

In testimony whereof I affix my signature in presence of a witness.

ROBERT J. ABBOTT.

Witness:
BENNETT S. JONES.

Copies of this patent may be obtained for five cents each, by addressing the "Commissioner of Patents, Washington, D. C."